March 7, 1939.  J. J. MARTIN  2,149,923
FISHING DEVICE
Filed June 22, 1938   2 Sheets-Sheet 1
Fig. 1.
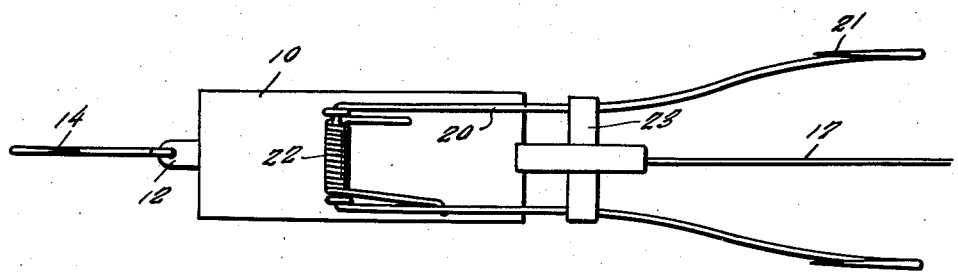
Fig. 2.
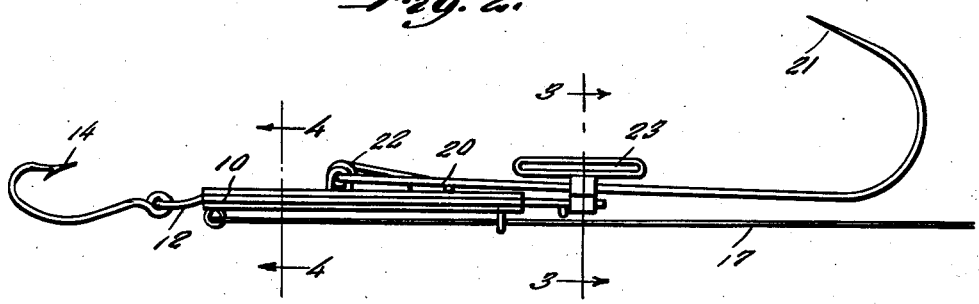
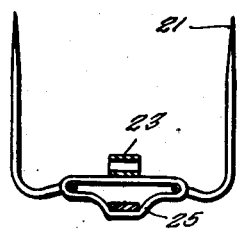
Fig. 3.
Fig. 4.
Inventor
J. J. Martin
By Clarence A. O'Brien
and Hyman Berman
Attorneys March 7, 1939. J. J. MARTIN 2,149,923
FISHING DEVICE
Filed June 22, 1938 2 Sheets-Sheet 2
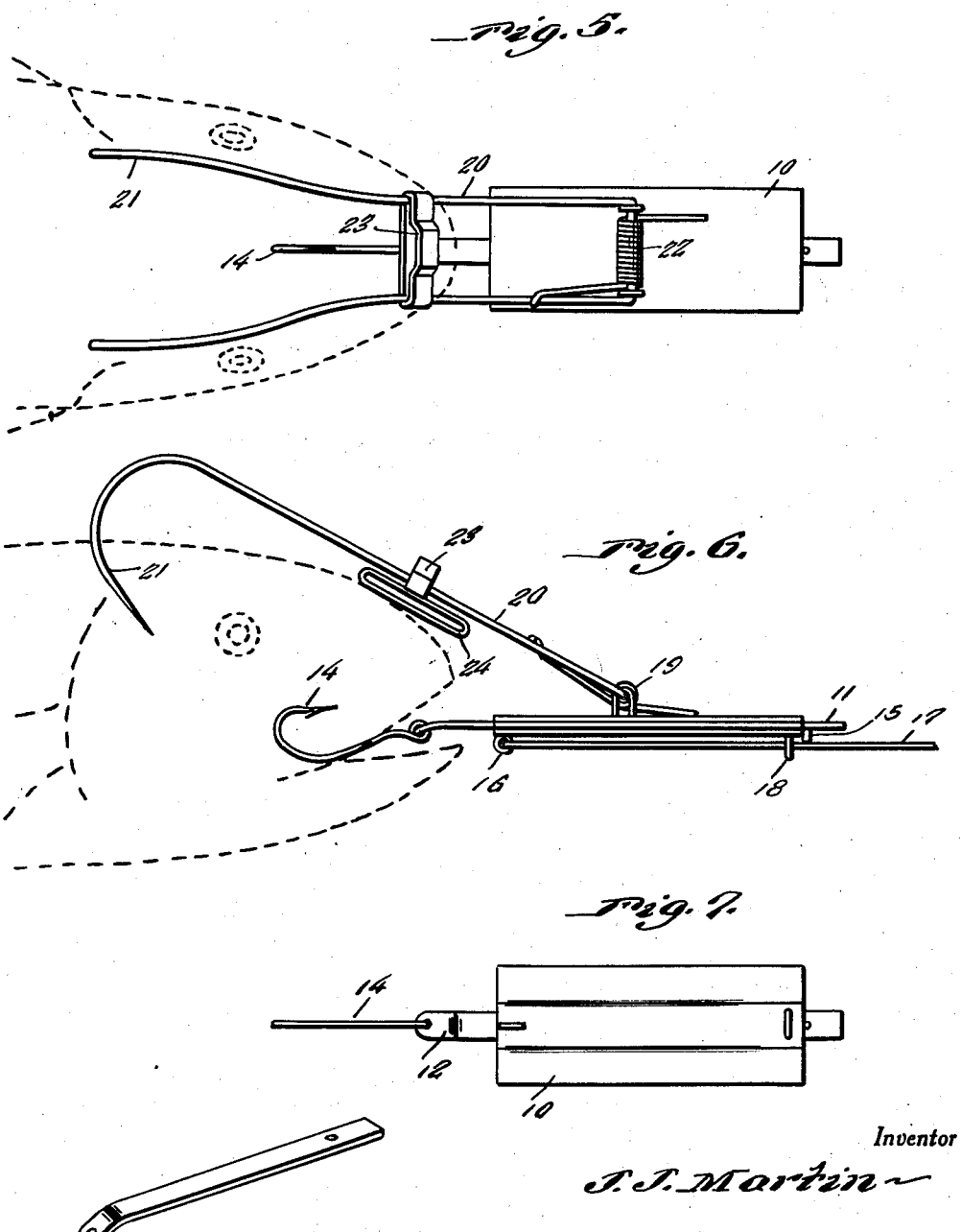

Patented Mar. 7, 1939

2,149,923

UNITED STATES PATENT OFFICE 2,149,923

FISHING DEVICE

Jennie J. Martin, St. Ignace, Mich.

Application June 22, 1938, Serial No. 215,259

2 Claims. (Cl. 43—37)

This invention relates to a fishing device to be used in conjunction with an ordinary fishing hook and line baited with live bait or any other form of bait and if desired may be employed with artificial bait, and has for the primary object the provision of a device of this character which will automatically catch into a fish after the latter strikes or takes the bait and the regular hook in the mouth and so secures the fish that the throwing of the regular hook from the mouth will be prevented, consequently obviating any possibility of the fish becoming self-freed or lost.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a top plan view illustrating a fishing device constructed in accordance with my invention.

Figure 2 is a side elevation illustraitng the same.

Figure 3 is a transverse sectional view taken on the line 3—3 of Figure 2.

Figure 4 is a transverse sectional view taken on the line 4—4 of Figure 2.

Figure 5 is a top plan view of the device showing in dotted line a fish caught by said device.

Figure 6 is a side elevation showing in dotted line a fish caught by the device.

Figure 7 is a bottom plan view of a holder forming a part of the invention and the slide carried thereby.

Figure 8 is a perspective view illustrating the slide.

Referring in detail to the drawings, the numeral 10 indicates an elongated casing comparatively thin in thickness and provides a slidable mounting for a slide 11, the ends of which project beyond opposite ends of the casing. One end of the slide is slightly offset, as shown at 12, and is provided with an opening 13 to permit the connecting thereto of a fish hook 14 of a conventional construction. Instead of fastening the fish hook 14 directly to the slide, a leader may be employed between the slide and the fish hook. Adjacent the opposite end of the slide 11 is a pin or stop 15 to abut one end of the casing for limiting the sliding movement of the slide in one direction or in the direction under the influence of a fish caught on the hook 14. The opposite end of the casing is provided with an eye 16 to which is attached the end of the fishing line 17, the fishing line also extending through a guide eye 18 mounted on the casing.

A pair of bearing elements 19 are secured on the top wall of the casing and has journaled therein a substantially U-shaped member 20, the end portions of which are bent and sharpened to form hooks 21 minus of barbs. A coil spring 22 is mounted on the connecting portion of the substantially U-shaped member 20 between the bearings 19 and one end thereof of offset to engage the member 20 while the opposite end bears against the top wall of the casing. The normal action of the spring 22 is to propel the hooks 21 towards the hook 14 or into engagement with a fish, as shown in Figures 5 and 6 of the drawings.

A slide 23 including a finger piece 24 is secured on the substantially U-shaped member 20 and includes a loop portion 25 adapted to be brought over the non-hook carrying end of the slide 11. With the loop portion of the slide in engagement with the slide 11, the hooks 21 are held in the position as shown in Figures 1 and 2 against the action of the spring 22. It is to be noted that the hook-carrying end of the slide 11 is then positioned adjacent one end of the casing so that when a fish takes the hook in the mouth and the bait carried by said hook and makes a pull against the line 17 a limited sliding movement of the slide 11 will take place, moving said slide 11 out of engagement with the offset or loop portion 25 of the slide or holding member 23, freeing the hooks 21 so that they may be driven by the spring 22 into the fish at opposite sides of the head adjacent the gills of the fish. The hooks 21 when driven into the head of the fish will prevent the fish from throwing the hook 14 out of its mouth and obviates any possibility of the fish freeing itself from the line and becoming lost.

A device of the character described and shown in the drawings is easily connected to an ordinary fishing line and will not interfere in any way with the usual method of fishing and further it is to be noted that the device is compact, durable and efficient and may be manufactured and sold at a low cost. Further, it is to be noted that the present invention may be successfully used with any type of fishing hook or bait employed and will assure catching of a fish after the latter once takes the bait and regular hook into the mouth with a pull thereon.

It is believed that the foregoing description, when taken in connection with the accompanying drawings will fully set forth the construction and advantages of this invention to those skilled in the art to which such a device relates, so that further detailed description will not be required.

Having described my invention, what I claim is:

1. A fishing device comprising a casing, means on said casing for securing the latter to a fishing line, a trigger element slidable in said casing and having its ends exposed and having a fishing hook secured to one end thereof, a jabbing means hingedly mounted on said casing, spring means acting on said jabbing means to drive the latter into a fish when the latter takes the fishing hook into its mouth with a pull, and a chip slidable on said jabbing means with a frictional fit to engage with the trigger for releasably securing the jabbing means in a position away from the fishing hook.

2. A fishing device comprising a casing secured to a fishing line, a trigger element mounted in said casing for a limited sliding movement and having a fishing hook connected thereto, a substantially U-shaped member journaled on said casing and having its end portions bent to form jabbing hooks spaced from each other, a holding device mounted on the substantially U-shaped member and including a finger piece and an offset portion to engage with the trigger element, and a spring means acting on said substantially U-shaped member to propel the jabbing hooks into engagement with a fish when the latter takes the fishing hook into the mouth with a pull.

JENNIE J. MARTIN.